(12) United States Patent
Hawkins et al.

(10) Patent No.: US 9,353,877 B2
(45) Date of Patent: May 31, 2016

(54) SLAM SHUT SAFETY DEVICE

(71) Applicant: EMERSON PROCESS MANAGEMENT REGULATOR TECHNOLOGIES, INC., McKinney, TX (US)

(72) Inventors: James C. Hawkins, Allen, TX (US); David B. Davis, Whitewright, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 10 days.

(21) Appl. No.: 14/503,970

(22) Filed: Oct. 1, 2014

(65) Prior Publication Data
US 2016/0097461 A1  Apr. 7, 2016

(51) Int. Cl.
*F16K 17/00*  (2006.01)
*F16K 17/18*  (2006.01)
*G05D 16/10*  (2006.01)

(52) U.S. Cl.
CPC .............. *F16K 17/18* (2013.01); *G05D 16/10* (2013.01); *Y10T 137/773* (2015.04)

(58) Field of Classification Search
CPC ....... F16K 17/18; F16K 17/04; F16K 17/042; G05D 16/10; Y10T 137/7723; Y10T 13/7725; Y10T 13/773
See application file for complete search history.

(56) References Cited

U.S. PATENT DOCUMENTS

| | | | | |
|---|---|---|---|---|
| 3,633,416 A * | 1/1972 | Van Dyke | ................. | G01F 1/26 73/199 |
| 3,818,932 A * | 6/1974 | Doe | ......................... | A62C 4/02 137/458 |
| 4,067,359 A * | 1/1978 | Kwast | ..................... | F16K 17/00 137/461 |
| 4,134,421 A * | 1/1979 | Cameron | .............. | B23P 15/001 137/316 |
| 8,225,812 B2 * | 7/2012 | Faillat | ................... | F16K 17/042 137/460 |
| 8,474,786 B2 * | 7/2013 | Schneider | ............... | F16K 1/487 137/494 |
| 2012/0111425 A1 * | 5/2012 | Hawkins | ............ | G05D 16/0683 137/489 |
| 2012/0133755 A1 * | 5/2012 | Kuroda | .............. | G01N 21/6486 348/79 |
| 2012/0261604 A1 * | 10/2012 | Woollums | ............... | F16K 17/32 251/337 |
| 2014/0083515 A1 * | 3/2014 | Sanders | ................ | F16K 17/164 137/12 |
| 2014/0083525 A1 * | 3/2014 | Nguyen | ................ | F16K 17/164 137/456 |
| 2014/0083526 A1 * | 3/2014 | Moldovan | ................. | F16K 1/36 137/461 |
| 2014/0130884 A1 * | 5/2014 | Sanders | .................. | F16K 17/00 137/12 |

FOREIGN PATENT DOCUMENTS

FR  2915293 A1 * 10/2008 ............ F16K 17/042

OTHER PUBLICATIONS

International Search Report and Written Opinion of International Application No. PCT/US2015/053435 dated Jan. 21, 2016.

* cited by examiner

*Primary Examiner* — Jessica Cahill
(74) *Attorney, Agent, or Firm* — Marshall, Gerstein & Borun LLP

(57) ABSTRACT

A safety device for a gas distribution system includes a valve body, an upper casing attached to the valve body, the upper casing housing at least one spring. Further, the at least one spring is attached to a movable diaphragm that is exposed to gas system pressure. The valve body also includes a release element mounted within the valve body. The release element releasing a relatch plug when the device is activated to move a safety disc into contact with a valve seat to stop fluid from flowing when an overpressure or an underpressure condition is sensed.

17 Claims, 3 Drawing Sheets

US 9,353,877 B2

SLAM SHUT SAFETY DEVICE

BACKGROUND

1. Field of the Disclosure

The disclosure generally relates to safety devices for gas distribution systems, and specifically relates to slam-shut type safety valves.

2. Related Technology

Gas distribution systems, in particular natural gas distribution systems, typically transport gas from a producer to a consumer along a series of pipes and through a series of valves. Each gas distribution system may include one or more regulator valves that control the pressure of the gas within the distribution system. Normally, the gas is transmitted at a high pressure through the system. However, the pressure of the gas must be reduced prior to final distribution to the consumers. This pressure reduction is typically accomplished at pressure reducing stations within local networks.

Typically, these pressure reducing stations include one or more pressure regulating valves and some sort of safety device to shut off the flow of gas should the pressure regulating valve fail. Most commonly, slam-shut safety valves are used for this purpose when the release of gas to the atmosphere is not desired or allowed. For example, U.S. Pat. No. 4,134,421, which is hereby incorporated by reference herein, discloses a slam-shut safety valve that provides overpressure protection in a pipeline. The slam-shut safety valve is generally disposed upstream of the pressure regulating valve so that the slam-shut valve may prevent gas from reaching the pressure regulating valve in the event of a pressure regulating valve failure. The slam-shut safety valve monitors gas pressure downstream of the pressure regulating valve for maximum and minimum pressure tolerances. If the downstream pressure exceeds either the maximum or minimum tolerance, the slam-shut safety valve closes, cutting off the flow of gas to the pressure regulating valve and preventing an uncontrolled leak of gas due to the pressure regulating valve failure.

Another example of a slam-shut safety valve is disclosed in U.S. Pat. No. 8,225,812, which discloses an over and under pressure protection device. U.S. Pat. No. 8,225,812 is hereby incorporated by reference herein.

Known slam-shut safety valves suffer from several problems. For example, the latching plugs in known slam-shut safety valves were guided by a reset rod, which was susceptible binding if the reset rod bent under high pressure loads from a latching cam. Additionally, known slam-shut safety valves attached the latching plugs to the reset rod with clips, which were subject to failure in high flow velocity valves because the clips could not resist the high kinetic forces generated by the high flow velocity valves. Furthermore, the safety discs of known slam-shut safety devices are easily misaligned when encountering high flow velocities, which resulted in incomplete sealing on the valve port and unreliable shutoffs.

BRIEF DESCRIPTION OF THE DRAWINGS

Objects, features, and advantages of the present invention will become apparent upon reading the following description in conjunction with the drawing figures, in which.

DETAILED DESCRIPTION

Figure 1:
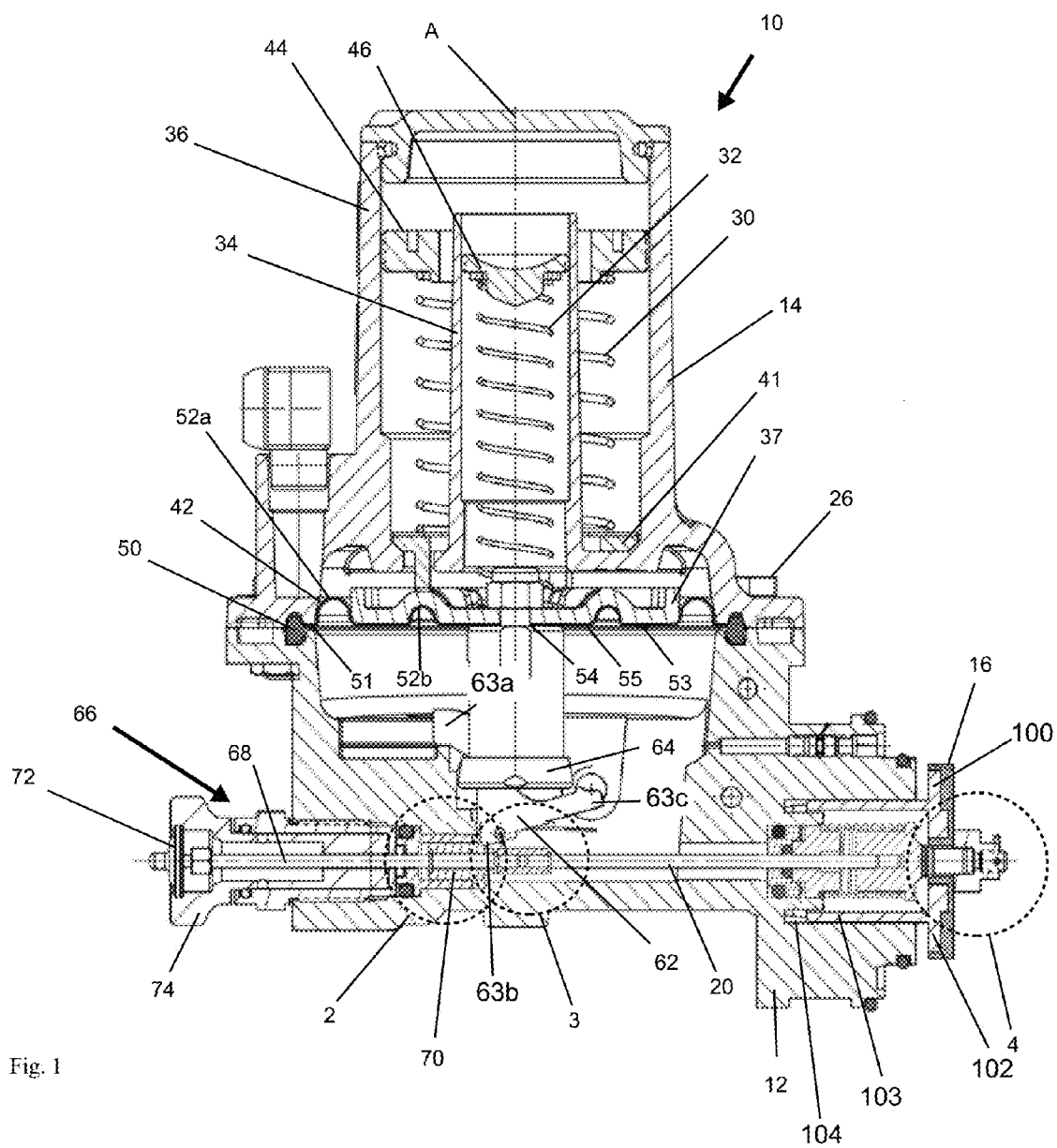
FIG. 1 is a cross-sectional view of a slam shut safety device constructed in accordance with the teachings of the disclosure.

Turning now to the figures, FIG. 1 illustrates a slam shut safety device 10 constructed in accordance with the teachings of the disclosure. The slam shut safety device 10 may be attached to a main regulator (not shown) in a gas distribution system. The slam shut safety device 10 includes a valve body 12, an upper case 14 attached to the valve body, a safety disc 16, and a reset pin 20. The upper case 14 may attached to the valve body 12 with fasteners 26. The fasteners 26 may be bolts, rivets, screws, or virtually any other type of fastener appropriate for attaching one component to another component. In other embodiments, the upper case 14 may be integrally formed with the valve body 12.

The upper case 14 houses an overpressure spring 30 and an underpressure spring 32. The underpressure spring 32 determines the lower (minimum) acceptable gas pressure in the gas distribution system. The overpressure spring 30 determines the upper (maximum) acceptable gas pressure in the gas distribution system. Both the overpressure and underpressure springs 30, 32 are disposed within the upper case 14 in a generally co-axial configuration (i.e., central axes of the two springs are co-located). However, the springs need not be axially co-located and the springs may be axially offset from one another. An inner casting tube 34 separates the overpressure spring 30 from the underpressure spring 32. An outer casting tube 36 surrounds the overpressure spring 30 and protects both the overpressure spring 30 and the underpressure spring 32 from environmental factors. The underpressure spring 32 is coupled at one end to a diaphragm plate 37, and the overpressure spring is coupled at one end to an overpressure ring 41. The overpressure ring 41 may be coupled to the diaphragm plate 37. Both the diaphragm plate 37 and the overpressure ring 41 may be attached to a diaphragm 42. The diaphragm 42 is exposed on one side to system pressure, and on another side the diaphragm 42 is exposed to spring forces from the overpressure spring 30 and the under pressure spring 32. A portion of the diaphragm 42 is movable and displaceable into an interior portion of the valve body 12 or the upper case 14, depending on system pressure along axis A. Axis A is substantially parallel to or with coaxial with the central axes of the overpressure spring 30 and the underpressure spring 32. In other embodiments, a single overpressure or underpressure spring may be employed.

At ends opposite the diaphragm 42, the overpressure spring 30 and the underpressure spring 32 contact or are seated against an overpressure adjustment cap 44 and an underpressure adjustment cap 46, respectively. The overpressure adjustment cap 44 and the underpressure adjustment cap 46 are displaceable along axis A towards and away from the diaphragm 42. In one embodiment, the overpressure adjustment cap 44 and the underpressure adjustment cap 46 may be threadedly engaged with the outer and inner casting tubes 36, 34, respectively. In particular, the overpressure cap 44 may be threadedly engaged to either an inner surface of the outer casting tube 36, or an outer surface of the inner casting tube 34. The underpressure cap 46 may be threadedly engaged with an inner surface of the inner casting tube 34. Both the underpressure cap 46 and the overpressure cap 44 are movable along axis A to adjust spring tension of the overpressure spring 30 and the underpressure spring 32 on the diaphragm plate 37. The distance between the adjustment caps 44, 46 and the diaphragm plate 37 determines the overpressure and underpressure set points for the slam-shut safety device 10.

The central axes of the overpressure spring 30 and the underpressure spring 32 are located on the same side of the diaphragm 42. Locating both the overpressure spring 30 and the underpressure spring 32 on the same side of the diaphragm 42 facilitates adjustment of both the overpressure spring 30 and the underpressure spring 32 from outside of the valve. Moreover, adjustments to the overpressure spring 30 and the underpressure spring 32 may be made independently of one another. In other words, a user may adjust the overpressure spring 30 only, without affecting the underpressure spring 32, or vice versa. Furthermore, in at least one embodiment, the co-axial locations of the overpressure spring 30 and the underpressure spring 32 produces a compact upper case 14, which is advantageous for installation in tight or limited space locations.

The diaphragm 42 includes an outer o-ring 50 for sealing the upper case 14 with the valve body 12. The diaphragm 42 also includes first and second concentric convolutions 52a and 52b. Separating the o-ring 50 and the first convolution 52a is an outer planar region 51. Separating the first convolution 52a and the second convolution 52b is a middle planar region 53, and separating the second convolution 52b and a central opening 54 is an inner planar region 55. The first and second convolutions 52a, 52b allow a single diaphragm 42 to be used in both a low pressure configuration and a high pressure configuration. The central opening 54 may receive a fastener (such as a bolt) when attaching the diaphragm 42 to the diaphragm plate 37. The diaphragm 42 reduces manufacturing costs by being adapted to be used in both high pressure configurations and low pressure configurations. Additionally, inventory management is enhanced because only one diaphragm needs to be stored and higher order volumes are attained due to the reduced number of stocked parts.

The valve body 12 includes a release element, such as rotatable cam 62 having three cam arms 63a, 63b, 63c. The cam 62 is connected to the diaphragm 42 via a plunger 64 at the first cam arm 63a. As the plunger 64 moves upward in response to an overpressure condition which is strong enough to overcome the force produced by the overpressure spring 30, the cam 62 rotates clockwise (in this embodiment). As the cam 62 rotates, a latch connected to the second cam arm 63b is released and the safety disc 16 moves to a closed position (to the right in FIG. 1) to seal a safety seat (not shown), thus shutting off the gas supply to the main regulator. In response to an under pressure condition, in which the spring force of the underpressure spring 32 overcomes the system gas pressure, the plunger 64 moves downward against the third cam arm 63c, causing the cam 62 to rotate in a clockwise direction. After a predetermined amount of rotation, the latch connected to the second cam arm 63b is released and the safety disc 16 moves to the closed position, thus shutting off the gas supply to the main regulator.

The valve body 12 also includes a reset pin assembly 66 for relatching the cam 62. The reset pin assembly 66 includes a reset rod 68, a relatch plug 70, a travel indicator 72, and a reset sleeve 74. The reset rod 68 is slidable in the reset sleeve 74 in response to an interaction between the relatch plug 70 and the cam 62 at the second cam arm 63b. As the cam 62 rotates, the second cam arm 63b contacts a first shoulder 71a (FIG. 2) of the relatch plug 70 and forces the relatch plug 70 outward (to the left in FIGS. 1 and 2). This, in turn, moves the reset rod 68 outward, and the reset rod 68 contacts the travel indicator 72. When the reset rod 68 contacts the travel indicator 72, a center portion of the travel indicator 72 is moved outward, thereby producing a visual and tactile indication that the cam 62 is in an armed position. While a cam is illustrated as the release element in the present embodiment, other types of release elements may be used in other embodiments. For example, other embodiments may include sliding stems or ball bearings, or any other structure capable of releasably restraining the relatch plug.

Figure 2:
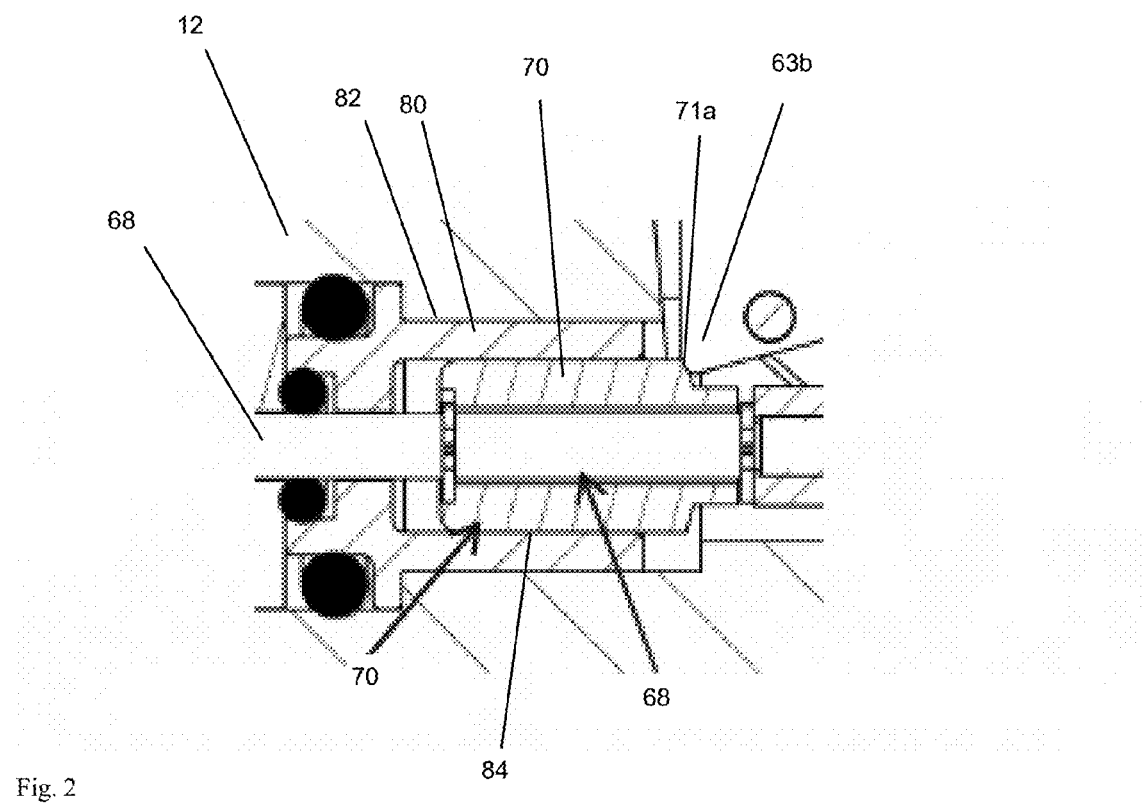
FIG. 2 is a close-up cross-sectional view of the latching plug of the slam shut safety device of FIG. 1.

Turning now to FIG. 2, a close up view of the relatch plug 70 is illustrated, taken from dashed circle 2 in FIG. 1. The relatch plug 70 slides within a relatch sheath 80. The relatch sheath 80 is seated within a bore 82 in the valve body 12. The relatch sheath 80 includes a central blind bore 84. The relatch plug 70 is seated within the central blind bore 84 such that the outer surface of the relatch plug 70 is externally guided along an internal surface of the central blind bore 84. Because the relatch plug 70 is externally guided, it is not susceptible to binding due to bending moments on the reset rod 68 imparted by the cam 62. This configuration also results in a tighter releasable connection between the relatch plug 70 and the cam 62 at the shoulder 71a. Additionally, external guiding increases internal clearance of the reset rod 68, which makes the reset assembly 66 less sensitive to variations in reset rod 68 straightness or misalignment. Furthermore, forces from the cam 62 are transferred to the relatch sheath 80 through the external guiding, which reduces bending of the reset rod 68.

Figure 3:
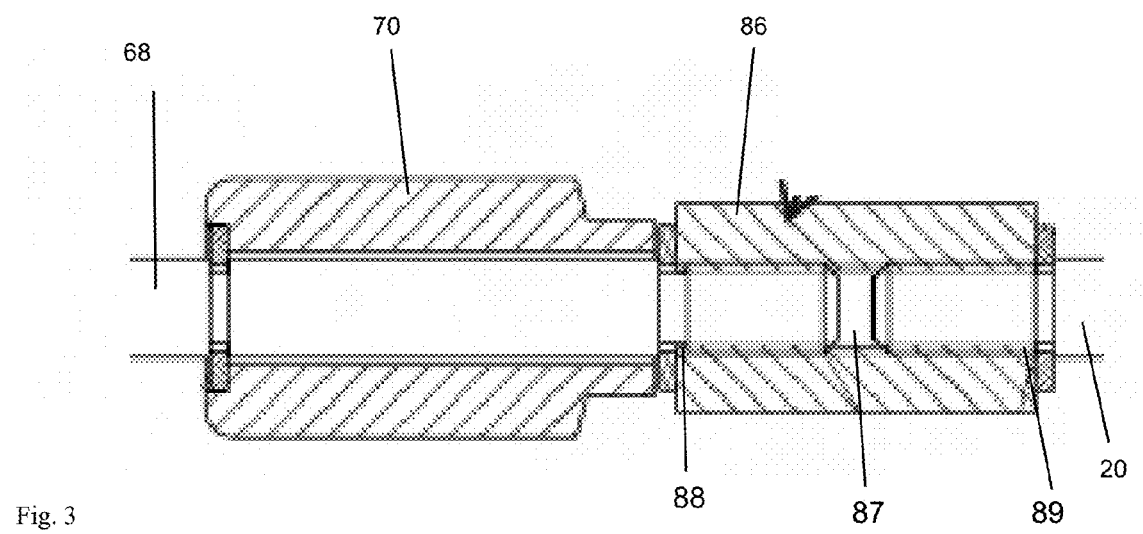
FIG. 3 is a close-up cross-sectional view of a coupling nut of the slam shut safety device of FIG. 1.

Turning now to FIG. 3, a close up view of a coupling nut 86 is illustrated, taken from the dashed circle 3 of FIG. 1. The coupling nut joins the reset rod 68 to the reset pin 20. As a result, two rods of shorter length may be used instead of a single long rod. Two shorter rods are less costly to produce and easier to assemble. Two shorter rods are stiffer than a single long rod, and are thus more resistant to bending. Moreover, the coupling nut 86 ensures that the reset rod 68 and the reset pin 20 are correctly aligned. The coupling nut 86 includes a through bore 87. The reset rod 68 is coupled to the coupling nut 86 at a first end 88 of the through bore 87. The reset pin 20 is coupled to the coupling nut 86 at a second end 89 of the through bore 87. The reset rod 68 and the reset pin 20 may be coupled to the coupling nut 86 with threaded connections in one embodiment. The coupling nut 86 also acts as a mechanical stop for the relatch plug 70. The coupling nut 86 is more resistant to high kinetic forces found in high flow devices.

Returning to FIG. 1, the safety disc 16 is mounted on a disc guide 100. The disc guide 100 includes a disc-shaped body 102 and a cylindrical skirt 103 extending away from the body 102 opposite the safety disc 16. The cylindrical skirt 103 is at least partially seated within an annular channel 104 formed in the valve body 12. As the reset pin 20 moves the safety disc 16 towards a valve seat (not shown) when the device is activated, movement of the safety disc 16 is aligned and guided by the interaction between the cylindrical skirt 103 and the annular channel 104 so that the safety disc 16 is properly aligned with the valve seat regardless of fluid pressures on the safety disc 16.

Figure 4:
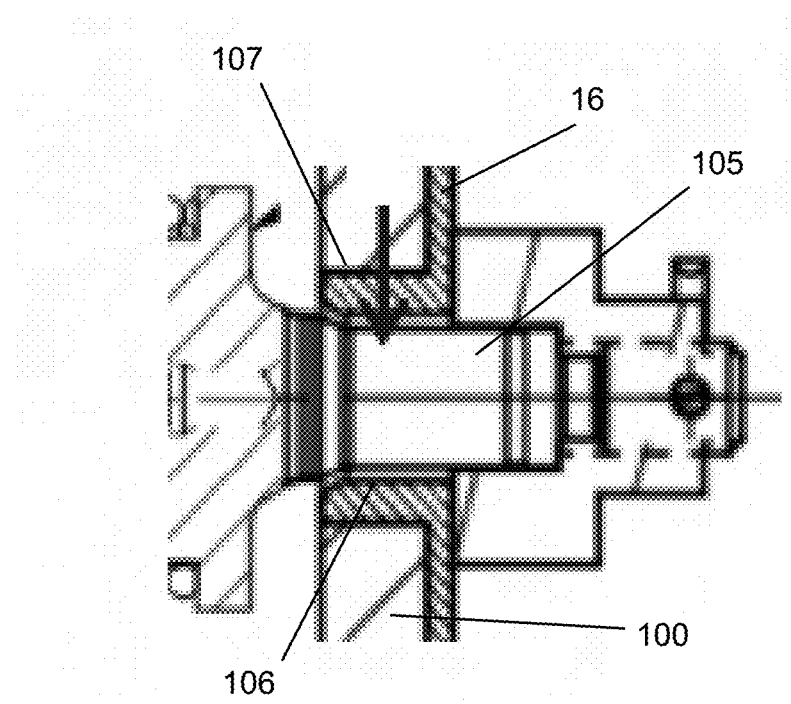
FIG. 4 is a close-up cross-sectional view of a portion of a valve disc of the slam shut safety device of FIG. 1.

Turning now to FIG. 4, a close up view of the safety disc 16 and disc guide 100 is illustrated, taken from dashed circle 4 of FIG. 1. Because cylindrical skirt 103 is guided by the annular channel 104 (FIG. 1), the safety disc 16 and disc guide 100 are sensitive to variations in the straightness of the reset pin 20. To solve this problem, the safety disc 16 and the disc guide 100 are mounted on a rod extension 105 with a degree of freedom of movement. For example, the safety disc 16 and the disc guide 100 may have central bores 106, 107, respectively, that have diameters that are greater than an outer diameter of the rod extension 105 so that the safety disc 16 and the disc guide 100 can move independently of the rod extension 105, to some extent, when the device is not activated.

While certain representative embodiments and details have been shown for purposes of illustrating the invention, it will be apparent to those skilled in the art that various changes in the methods and apparatus disclosed herein may be made without departing from the scope of the invention.

The invention claimed is:

1. A slam-shut safety valve comprising:
   a valve body;
   an upper case mounted to the valve body;
   a diaphragm disposed between the valve body and the upper case, at least part of the diaphragm being displaceable into an interior portion of the valve body and into an interior portion of the upper case, the diaphragm having a first side being exposed to gas system pressure;
   a spring disposed within the interior of the upper case, the spring exerting a spring force on a second side of the diaphragm opposite the gas system pressure;
   a plunger connected to the first side of the diaphragm;
   a release element mounted within the interior of the valve body;
   a relatch plug operatively connected to a reset rod, the relatch plug cooperating with the release element to move a safety disc between an armed position and an activated position; and,
   a relatch sheath cooperating with the relatch plug to guide movement of the relatch plug,
   wherein the relatch plug slides within the relatch sheath.

2. The slam-shut safety valve of claim 1, wherein the relatch sheath is seated within a bore in the valve body.

3. The slam-shut safety valve of claim 1 wherein the relatch plug includes a shoulder that cooperates with the release element to restrict movement of the relatch plug before the slam-shut safety valve is activated.

4. The slam-shut safety valve of claim 1, wherein the relatch sheath includes a central blind bore.

5. The slam-shut safety valve of claim 4, wherein the relatch plug is seated within the central blind bore.

6. The slam-shut safety valve of claim 5, wherein movement of the relatch plug is guided by an external surface of the relatch plug is sliding along an internal surface of the relatch sheath.

7. A slam-shut safety valve comprising:
   a valve body;
   an upper case mounted to the valve body;
   a diaphragm disposed between the valve body and the upper case, at least part of the diaphragm being displaceable into an interior portion of the valve body and into an interior portion of the upper case, the diaphragm having a first side being exposed to gas system pressure;
   a spring disposed within the interior of the upper case, the spring exerting a spring force on a second side of the diaphragm opposite the gas system pressure;
   a plunger connected to the first side of the diaphragm;
   a release element mounted within the interior of the valve body;
   a relatch plug operatively connected to a reset rod; the relatch plug cooperating with the release element to move a safety disc between an armed position and an activated position; and,
   a coupling nut operatively connected to the reset rod and to a reset pin,
   wherein the coupling nut includes a through bore having threads at each end, and the reset rod is threadedly secured to the coupling nut at a first end of the through bore and the reset pin is threadedly secured to the coupling nut at a second end of the through bore.

8. The slam-shut safety valve of claim 7, wherein the coupling nut is disposed adjacent to the relatch plug.

9. The slam-shut safety valve of claim 7, wherein the coupling nut mechanically stops the relatch plug from sliding along the reset rod.

10. A slam-shut safety valve comprising:
    a valve body;
    an upper case mounted to the valve body;
    a diaphragm disposed between the valve body and the upper case, at least part of the diaphragm being displaceable into an interior portion of the valve body and into an interior portion of the upper case, the diaphragm having a first side being exposed to gas system pressure;
    a spring disposed within the interior of the upper case, the spring exerting a spring force on a second side of the diaphragm opposite the gas system pressure;
    a plunger connected to the first side of the diaphragm;
    a release element mounted within the interior of the valve body;
    a relatch plug operatively connected to a reset rod; the relatch plug cooperating with the release element to move a safety disc between an armed position and an activated position; and,
    a disc guide, the safety disc being mounted on the disc guide,
    wherein the disc guide aligns and guides movement of the safety disc, and
    wherein the safety disc and the disc guide have central bores that are larger than the outer surface of a rod extension so that the safety disc and the disc guide are movable independently of the rod extension when the safety disc is in the armed position.

11. The slam-shut safety valve of claim 10, wherein the safety disc and disc guide are mounted on the rod extension, which is operatively connected to the reset rod.

12. The slam-shut safety valve of claim 10, wherein the disc guide includes a disc-shaped body and a cylindrical skirt extending away from the disc-shaped body, opposite the safety disc.

13. The slam-shut safety valve of claim 12, wherein the cylindrical skirt is at least partially seated within an annular channel formed in the valve body.

14. The slam-shut safety valve of claim 10 comprising a first adjustment cap disposed at an end of the spring opposite the diaphragm.

15. The slam shut safety valve of claim 14 wherein the first adjustment cap is threadedely secured to the upper casing and the first adjustment cap is displaceable along a spring axis, displacement of the first adjustment cap changing the amount of spring force on the diaphragm generated by the spring.

16. The slam-shut safety valve of claim 15 comprising a second spring and a second adjustment cap disposed at an end of the second spring opposite the diaphragm.

17. The slam-shut safety valve of claim 16 wherein the second adjustment cap is threadedely secured to the upper casing and the second adjustment cap is displaceable along a second spring axis, displacement of the second adjustment cap changing the amount of spring force on the diaphragm generated by the second spring.

* * * * *